United States Patent
Kohn et al.

(10) Patent No.: US 12,429,012 B2
(45) Date of Patent: Sep. 30, 2025

(54) TURBOJET ENGINE REAR PORTION HAVING AN AUGMENTED A9/A8 NOZZLE AREA RATIO

(71) Applicant: SAFRAN AIRCRAFT ENGINES, Paris (FR)

(72) Inventors: Thierry Kohn, Moissy-Cramayel (FR); Dimitri Thomas Krajka, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/546,543

(22) PCT Filed: Feb. 14, 2022

(86) PCT No.: PCT/FR2022/050262
§ 371 (c)(1),
(2) Date: Aug. 15, 2023

(87) PCT Pub. No.: WO2022/175620
PCT Pub. Date: Aug. 25, 2022

(65) Prior Publication Data
US 2024/0141852 A1     May 2, 2024

(30) Foreign Application Priority Data
Feb. 18, 2021  (FR) .......... 21 01523

(51) Int. Cl.
*F02K 1/12*     (2006.01)

(52) U.S. Cl.
CPC ........ *F02K 1/1223* (2013.01); *F05D 2220/80* (2013.01); *F05D 2250/90* (2013.01); *F05D 2260/57* (2013.01)

(58) Field of Classification Search
CPC ..... F02K 1/1223; F02K 1/1238; B64D 37/30; F05D 2250/90
See application file for complete search history.

(56) References Cited

U.S. PATENT DOCUMENTS 2,995,010 A * 8/1961 Arscott ............... F02K 1/1223
                                                  239/455
4,641,783 A * 2/1987 Camboulives ........ F02K 1/805
                                                  239/265.39

(Continued)

FOREIGN PATENT DOCUMENTS

EP    0 814 253 A1    12/1997
EP    0 833 047 A2    4/1998

OTHER PUBLICATIONS

International Search Report & Written Opinion issued Jun. 3, 2022 in PCT/FR2022/050262, filed on Feb. 14, 2022, 15 pages (With English Translation).

(Continued)

*Primary Examiner* — Devon C Kramer
*Assistant Examiner* — Roberto Toshiharu Igue
(74) *Attorney, Agent, or Firm* — Oblon, McClelland, Maier & Neustadt, L.L.P.

(57) ABSTRACT

A rear portion of a convergent-divergent nozzle turbojet engine includes a device for controlling the position of a divergent flap relative to that of a convergent flap, including a first connecting rod having a first end portion hinged to the convergent flap and an opposite second end portion, a second connecting rod having a first end portion hinged to the divergent flap and an opposite second end portion, and a third connecting rod having a first end portion hinged to a synchronization ring and an opposite second end portion. The second end portion of the first connecting rod is hinged to the second end portion of the second connecting rod and/or to the second end portion of the third connecting rod, (Continued)

and the second end portion of the third connecting rod is hinged to the second end portion of the second connecting rod.

3 Claims, 6 Drawing Sheets

(56) References Cited

U.S. PATENT DOCUMENTS 5,269,466 A * 12/1993 Maguire ............... F02K 1/1292
  239/265.41
2018/0171931 A1 * 6/2018 Watson ................. F02K 1/1246

OTHER PUBLICATIONS

French Preliminary Search Report issued Oct. 27, 2021 in FR Application 21 01523, filed on Feb. 18, 2021, 10 pages (With English Translation of Categories of Cited Documents & Written Opinion).

* cited by examiner

TURBOJET ENGINE REAR PORTION HAVING AN AUGMENTED A9/A8 NOZZLE AREA RATIO

TECHNICAL FIELD

The present invention relates to the field of variable-geometry nozzles of turbojet engines intended for the aircraft propulsion.

PRIOR ART

Turbojet engines intended for supersonic flight generally comprise an afterburner channel whose outlet is delimited by an axisymmetric variable-geometry nozzle, i.e. capable of adapting its geometry to the different speeds at which such an aircraft is likely to fly.

To this end, such a nozzle comprises at least one set of movable inner flaps, called convergent flaps, distributed around the longitudinal axis of the turbojet engine and each having an upstream end hinged on an inner structure of the casing, each of the convergent flaps comprising a panel intended to channel the exhaust gas flows within the nozzle. Such a nozzle further comprises a system for controlling the convergent flaps capable of causing pivoting of these about their hinge axes to the casing in a synchronised manner.

Quite often, the nozzles intended for supersonic flight further comprise another set of movable inner flaps, called divergent flaps, distributed around the longitudinal axis, each comprising a panel intended to channel the exhaust gas flows within the nozzle, and having respective upstream ends hinged on downstream ends of the convergent flaps, whereby such a nozzle is called a convergent-divergent nozzle.

In this case, the control system is further configured to control the positions of the divergent flaps on the basis of those of the convergent flaps. Thus, such a system allows continuously varying the respective inclinations of the convergent flaps with respect to the longitudinal axis of the turbojet engine, and making inclinations of the divergent flaps, with respect to this axis, correspond thereto according to a determined unambiguous law. Thus, in particular, such a nozzle allows varying the position and the shape of the neck of the nozzle.

It should be noted that the "divergent" qualifier does not exclude that the considered flaps could adopt orientations parallel to the longitudinal axis and even convergent in some operation phases.

An important parameter for the operation of such nozzles is the A9/A8 ratio, wherein A8 refers to the section of the nozzle at the neck formed at the junction between the convergent flaps and the divergent flaps, whereas A9 refers to the section of the nozzle at the downstream end of the divergent flaps.

The range in which this A9/A8 ratio varies, for a given nozzle, depends on the configuration of the means implemented to control the positions of the divergent flaps on the basis of those of the convergent flaps.

In this context, there is a need for a variable-geometry nozzle whose movable inner flaps control system is efficient and compact in order to enable integration thereof in a limited space, while allowing maximising the range of possible values for the A9/A8 ratio.

DISCLOSURE OF THE INVENTION

In particular, the invention aims to address this need in a simple, economical and effective manner.

To this end, it provides a turbojet engine rear portion, comprising:
 an upstream stator structure;
 a convergent-divergent nozzle with a variable geometry comprising a set of convergent flaps distributed around a longitudinal axis of the rear portion of the turbojet engine, each comprising a panel intended to channel an exhaust gas flow within the nozzle, and each having an upstream end hinged on the upstream stator structure, and further comprising a set of divergent flaps distributed around the longitudinal axis, each comprising a panel intended to channel the exhaust gas flow within the nozzle, and each having an upstream end hinged on a downstream end of a corresponding convergent flap;
 a synchronisation ring arranged around the set of convergent flaps or the upstream stator structure;
 drive means configured to move the synchronisation ring in translation according to the longitudinal axis, relative to the upstream stator structure;
 actuating means by which the synchronisation ring acts on at least some of the convergent flaps, called controlled convergent flaps, to control a geometric variation of the nozzle; and
 means for controlling the positions of the divergent flaps on the basis of those of the convergent flaps, comprising a first connecting rod having a first end portion hinged to the corresponding convergent flap and an opposite second end portion, a second connecting rod having a first end portion hinged to the corresponding divergent flap and an opposite second end portion, and a third connecting rod having a first end portion hinged to the synchronisation ring and an opposite second end portion;
 wherein the second end portion of the first connecting rod is hinged to at least one amongst the second end portion of the second connecting rod and the second end portion of the third connecting rod, and
 the second end portion of the third connecting rod is hinged to the second end portion of the second connecting rod.

Therefore, the means implemented for controlling the flaps may have a size and a mass that are limited as best as possible, while allowing for an extended range of values for the A9/A8 ratio.

In preferred embodiments of the invention, the second end portion of the first connecting rod is hinged together to the second end portion of the second connecting rod and to the second end portion of the third connecting rod, according to a common hinge axis.

In other preferred embodiments of the invention, the second end portion of the third connecting rod is hinged to the second end portion of the second connecting rod according to a fifth hinge axis, and the second end portion of the first connecting rod is hinged to the second end portion of the second connecting rod according to a sixth hinge axis located between the fifth hinge axis and the first end portion of the second connecting rod.

Preferably, a A9/A8 ratio, equal to the quotient of a section A9 of the nozzle at a downstream end of the divergent flaps by a section A8 of the nozzle at a neck formed at a junction between the convergent flaps and the divergent flaps, varies within a range wider than 0.35.

The invention also relates to a turbojet engine for an aircraft, comprising a rear portion of the type described hereinabove.

BRIEF DESCRIPTION OF THE DRAWINGS

The invention will be better understood, and other details, advantages and features will thereof appear upon reading the following description given as a non-limiting example and with reference to the appended drawings wherein.

In all these figures, identical references may refer to identical or similar elements.

DETAILED DISCLOSURE OF PREFERRED EMBODIMENTS

Figure 1:
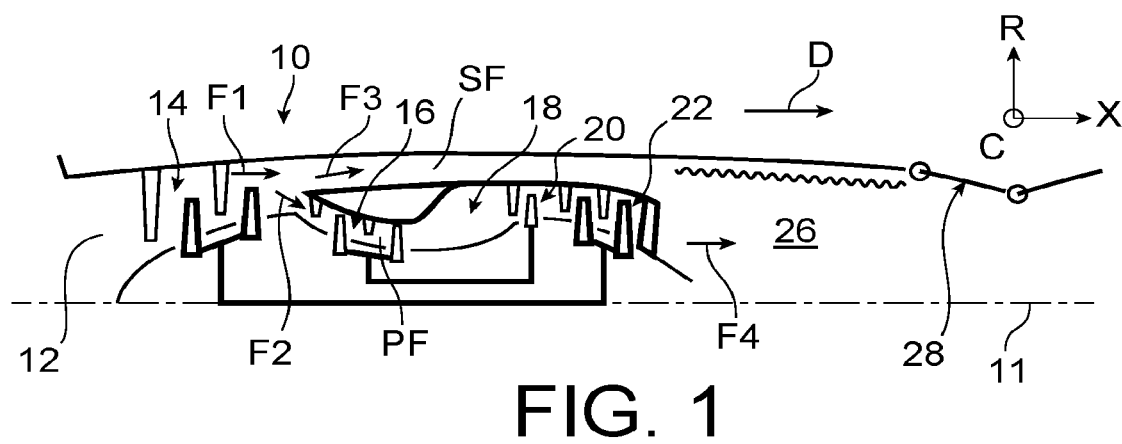
FIG. 1 is a schematic half-view in axial section of a turbojet engine comprising a variable-geometry nozzle.

FIG. 1 illustrates a turbojet engine 10, for example a twin-spool, turbofan engine, intended for the propulsion of an aircraft capable of supersonic flight, and therefore intended in particular to be installed in the fuselage of such an aircraft. Of course, the invention is applicable to other types of turbojet engines.

Throughout this description, the axial direction X is the direction of the longitudinal axis 11 of the turbojet engine. Unless stated otherwise, the radial direction R is at all points a direction orthogonal to the longitudinal axis 11 and passing through the latter, and the circumferential direction C is at all points a direction orthogonal to the radial direction R and to the longitudinal axis 11. Unless stated otherwise, the terms "inner" and "outer" respectively refer to a relative proximity, and a relative remoteness, of an element with respect to the longitudinal axis 11. Finally, the "upstream" and "downstream" qualifiers are defined with reference to a general direction D of the flow of gases in the turbojet engine 10.

For illustration, such a turbojet engine 10 comprises, from upstream to downstream, an air inlet 12, a low-pressure compressor 14, a high-pressure compressor 16, a combustion chamber 18, a high-pressure turbine 20, a low-pressure turbine 22, a post-combustion channel 26, and a variable-geometry nozzle 28, for example of the convergent-divergent type. All these members of the turbojet engine are centred according to the longitudinal axis 11 of the turbojet engine.

As is known, the high-pressure compressor 16, the combustion chamber 18, and the high-pressure 20 and low-pressure 22 turbines define a primary flow path PF. The latter is surrounded by a secondary flow path SF of the turbine engine which extends from upstream to downstream from an outlet of the low-pressure compressor. Thus, in operation, air F1 which has entered through the air inlet 12 and which has been compressed by the low-pressure compressor 14, is divided afterwards into a primary flow F2 which circulates in the primary flow path and into a secondary flow F3 which circulates in the secondary flow path. The primary flow F2 is then compressed further in the high-pressure compressor 16, then mixed with fuel and ignited in the combustion chamber 18, before undergoing an expansion in the high-pressure turbine 20 then in the low-pressure turbine 22.

Afterwards, the exhaust gas flow F4, consisting of the mixture of combustion gases, derived from the primary stream, and the secondary flow F3, circulates in the post-combustion channel 26, then escapes from the turbojet engine 10 throughout the nozzle 28.

In operating engine speed with afterburner, for example to propel an aircraft at supersonic speeds, fuel is mixed with the exhaust gas flow F4 within the afterburner channel 26, and the mixture thus formed is ignited within this afterburner channel, to generate additional thrust.

Figure 2:
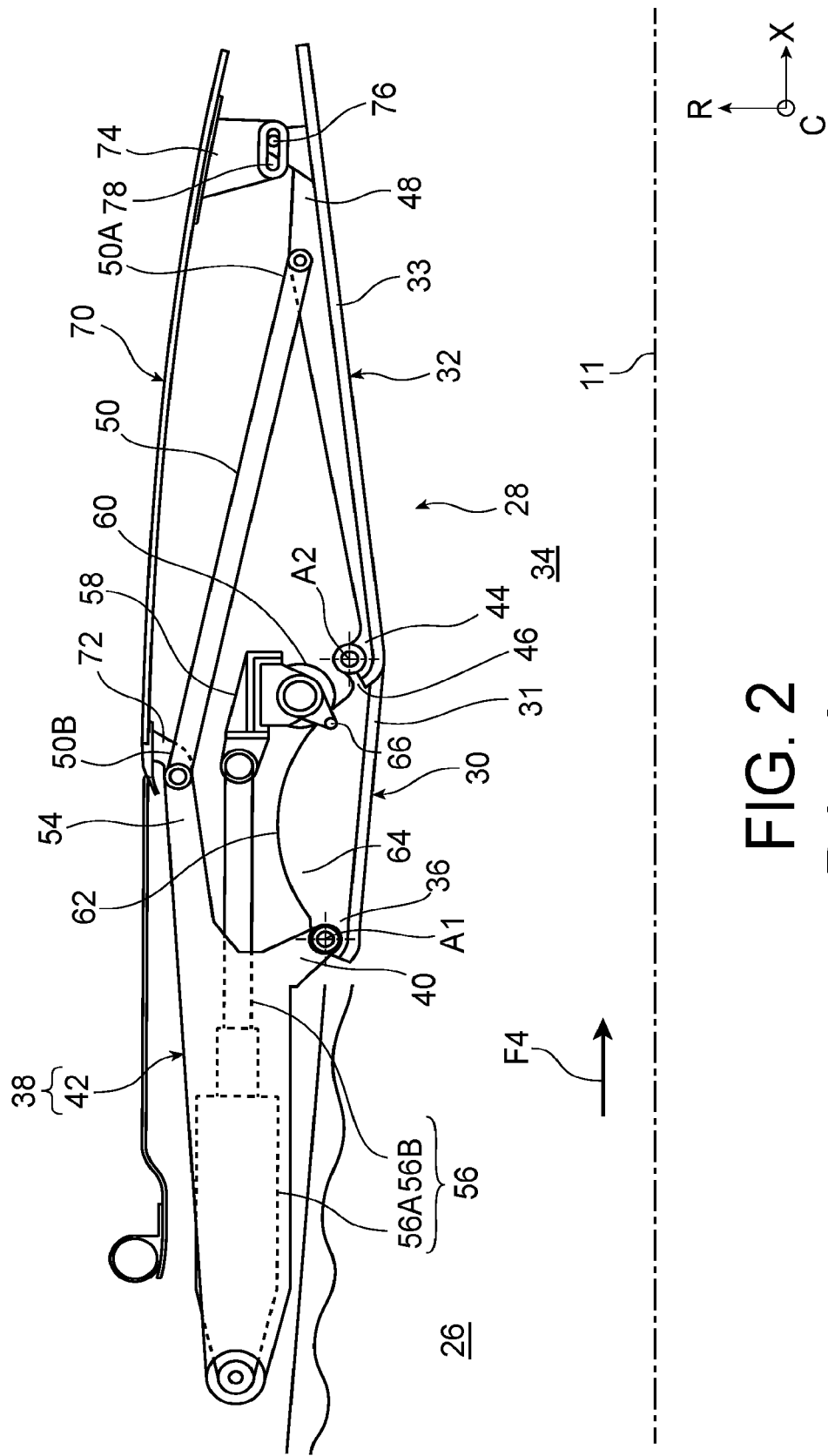
FIG. 2 is a schematic half-view in axial section of a turbojet engine rear portion of a known type.
Figure 3:
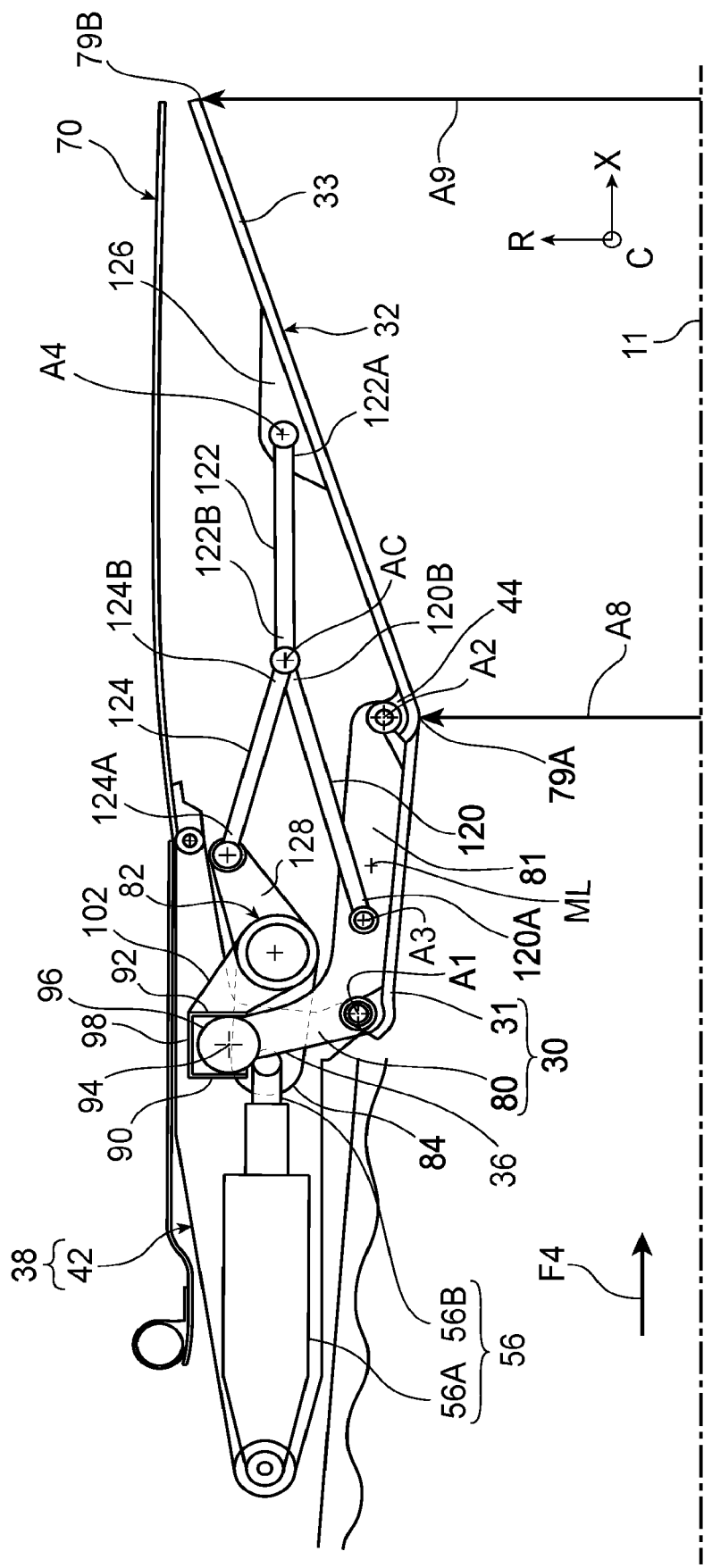
FIG. 3 is a schematic half-view in axial section of a rear portion of the turbojet engine of FIG. 1, according to an embodiment of the invention, in a low convergence configuration of the convergent flaps.
Figure 4:
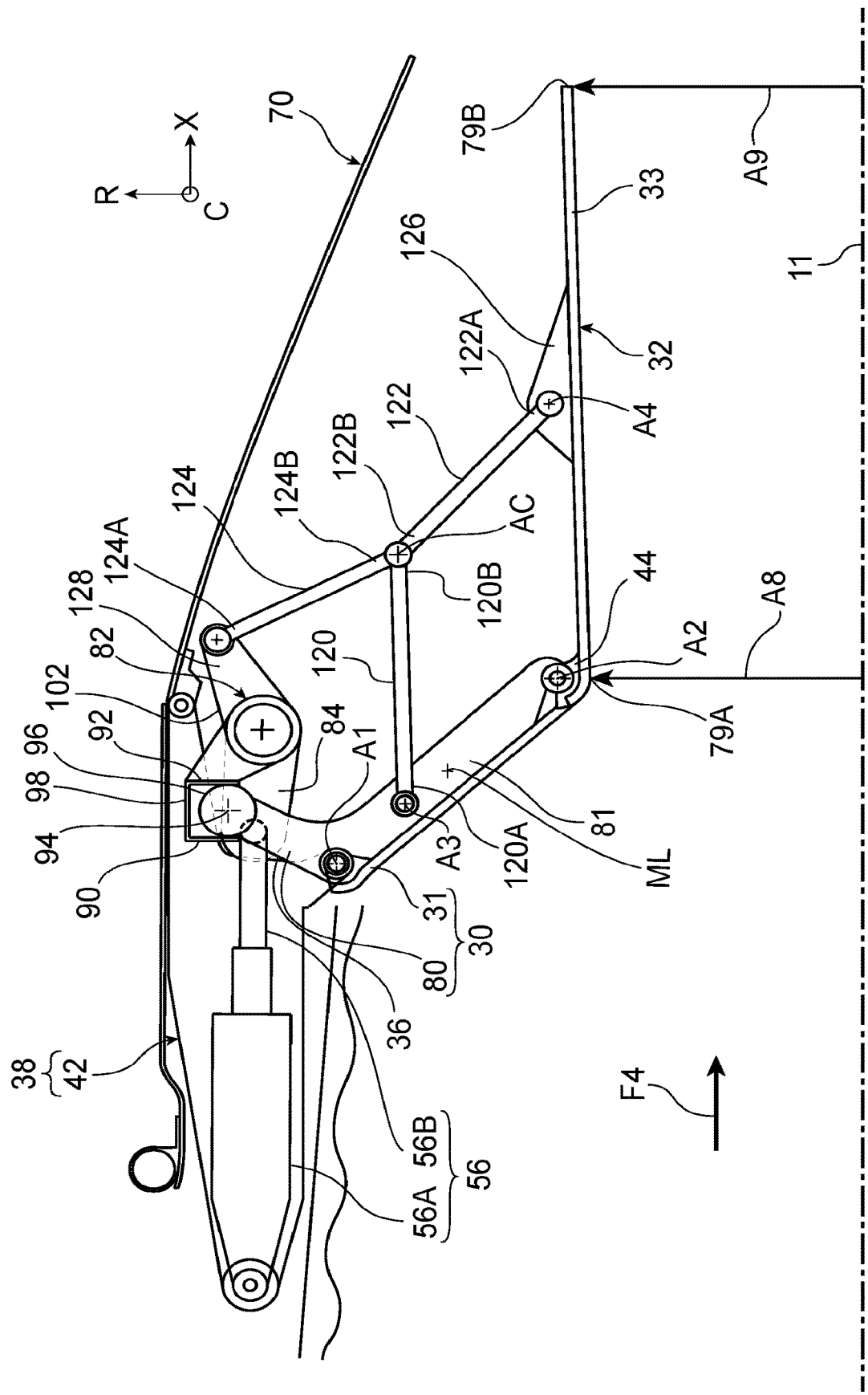
FIG. 4 is a schematic half-view in axial section of the rear portion of the turbojet engine of FIG. 1, in a high convergence configuration of the convergent flaps.

FIG. 2 illustrates on a larger scale a turbojet engine rear portion in a configuration known from the prior art, and in particular revealing the movable inner flaps of the nozzle.

The movable inner flaps are composed, upstream, of a set of convergent flaps 30 distributed around the longitudinal axis 11, and, downstream, of a set of divergent flaps 32 also distributed around the longitudinal axis 11.

Each of these movable inner flaps includes a panel 31, 33 contributing to externally delimiting an exhaust gas circulation channel 34 defined in the extension of the post-combustion channel 26. Thus, the movable inner flaps 30, 32 allow channelling the exhaust gas flow F4 at the outlet of the turbojet engine 10, in operation.

The convergent flaps 30 are hinged at their upstream ends 36 on a stator structure 38 of the turbojet engine rear portion, in this case on inner clevises 40 of beams 42 belonging to said stator structure, so that the convergent flaps 30 are movable in rotation around first hinge axes A1 attached to the stator structure 38.

The divergent flaps 32 are hinged, at their upstream ends 44, on the downstream ends 46 of the convergent flaps 30, so that the divergent flaps 32 are movable in rotation around second hinge axes A2 attached to the convergent flaps 30 and generally parallel to the first axes A1. The divergent flaps 32 are also hinged, at their downstream ends 48, on first ends 50A of connecting rods 50 having opposite second ends 50B hinged on the stator structure 38, in this case on outer clevises 54 of the beams 42.

A control system of the movable inner flaps includes drive means configured to act on at least some of the convergent flaps, which will be referred to as controlled convergent flaps hereinafter. In the case where other convergent flaps are subjected to the action of the drive means only via the controlled convergent flaps, these other convergent flaps are called follower convergent flaps, in a well-known manner.

The drive means typically consist of cylinders 56 each having a stator portion, for example their body 56A, fastened to the stator structure 38, and a movable portion, for example their rod 56B, secured to a corresponding roller carrier 58, on which a roller 60 is mounted bearing rolling on a cam 62 formed by a structure 64 secured to the panel 31 of a corresponding convergent flap 30, the roller carrier 58 being further secured to a retaining finger 66 cooperating with the structure 64 to radially retain the convergent flap 30 and in particular avoid the flap lowering under the effect of gravity when the turbojet engine is at stop. Thus, the set of movable inner flaps 30 and 32 forms an isostatic system with the stator structure 38.

Thus, a translational movement of the movable portion of each cylinder 56 allows causing a movement of the convergent flaps 30 in rotation around the first hinge axes A1, which is accompanied with a movement of the divergent flaps 32 in rotation around the second hinge axes A2, during which the stroke of the divergent flaps is determined by the connecting rods 50. Such movements of the movable inner flaps 30, 32 result in modifying the profile of the nozzle and in particular the section of the neck of the latter at the junction between the convergent flaps and the divergent flaps.

The nozzle further includes movable outer flaps 70 having upstream ends 72 hinged on the stator structure 38, for example on the outer clevises 54 of the beams 42, and downstream ends 74 attached to the downstream ends 48 of the divergent flaps 32, for example by means of roller 76 and slide 78 connecting devices.

The variable geometry configuration of the nozzle 28 allows adapting the latter to the different flight phases. Thus, in subsonic speed, the convergent inner flaps are for example kept in a low convergent configuration, whereas in supersonic speed, the convergent inner flaps adopt a more convergent configuration.

An important parameter for the operation of such a nozzle is the A9/A8 ratio, wherein A8 refers to the section of the nozzle at the neck 79A formed at the junction between the convergent flaps 30 and the divergent flaps 32, whereas A9 refers to the section of the nozzle at the downstream end 79B of the divergent flaps 32. Such a A9/A8 ratio generally has a value comprised between 1.1 and 1.8.

The range of values in which the A9/A8 ratio varies, for a given nozzle, depends on the configuration of the means implemented to servo-control the positions of the divergent flaps 32 to those of the convergent flaps 30. In the example described hereinabove, this range is thus determined by the characteristics of the connecting rods 50 and by the way of connecting the latter to the divergent flaps 32 and to the stator structure 38, and is typically 0.15 wide. The rear portion of the turbojet engine of FIG. 1, according to an embodiment of the invention, which will now be described in more detail with reference to FIGS. 3 to 7, aims to obtain a wider range of values for the A9/A8 ratio.

For illustration, a preferred mode for controlling the convergent flaps will first be described in the following.

According to this preferred embodiment, each of the controlled convergent flaps 30 comprises a lever 80 secured to the panel 31 of the flap. Of course, such a lever 80 extends in a direction away from the longitudinal axis 11, from the panel 31 or, in the illustrated example, from a stiffening structure 81 arranged on the outer face of the panel 31 and secured to the latter.

Similarly to what is described hereinabove, the turbojet engine rear portion comprises drive means comprising a movable portion that can be moved axially on command relative to the upstream stator structure 38. For illustration, herein again, the drive means consist of cylinders 56, and all of the rods 56B of the cylinders form said movable portion.

In order to enable the movable portion of the drive means to act on the lever 80 of at least one of the controlled convergent flaps 30, said lever 80 is arranged axially between an upstream bearing wall 90 and a downstream bearing wall 92, which are rigidly secured to the movable portion of the drive means, so that the lever 80 is free to move relative to the upstream 90 and downstream 92 bearing walls at least according to the radial direction R with respect to the longitudinal axis 11.

In this manner, during a downstream movement of the movable portion of the drive means (consisting of the rods 56B), the upstream bearing wall 90 pushes the lever 80 downstream and thus causes pivoting of the convergent flap according to the corresponding first hinge axis A1, bringing the downstream end 46 of the flap closer to the longitudinal axis 11.

Conversely, during an upstream movement of the movable portion of the drive means, at least if the turbojet engine is at stop, the downstream bearing wall 92 pushes the lever 80 upstream and thus causes pivoting of the convergent flap 30 according to the corresponding first hinge axis A1, leading to move the downstream end 46 of the flap away from the longitudinal axis 11. If the turbojet engine is in operation, it is possible that the thrust of the gases on the convergent flap 30 is enough to cause pivoting of the latter even before the downstream bearing wall 92 comes into contact with the lever 80. Therefore, it is advantageously provided that the upstream bearing wall 90 has an increased rigidity in comparison with the downstream bearing wall 92. To this end, the upstream bearing wall 90 may be thicker than the downstream bearing wall 92, or the upstream bearing wall 90 may have stiffening ribs the downstream bearing wall 92 may be devoid of such stiffening ribs.

The lever 80 is provided with a bearing roller 96 with an axisymmetric cylindrical shape, mounted free in rotation on the lever 80 according to an axis 94 parallel to the corresponding first hinge axis A1, arranged between the upstream 90 and downstream 92 bearing walls, so that any contact of any one of the upstream 90 and downstream 92 bearing walls on the lever 80 is a cylinder/plane contact.

Thus, during a pivoting manoeuver of the convergent flap under the effect of a thrust force applied to the bearing roller 96 by one of the upstream 90 and downstream 92 bearing walls, the radial movement of the bearing roller 96 relative to the considered bearing wall is performed through a rolling of the bearing roller 96 on said bearing wall.

The axial spacing between the upstream 90 and downstream 92 bearing walls is larger than the diameter of the bearing roller 96, so that there is permanently an axial clearance between the bearing roller 96 and the bearing wall opposite to the bearing wall exerting the thrust on the bearing roller 96.

Advantageously, the bearing roller 96 is arranged at a free end of the lever 80, so as to maximise the lever arm exerted by the upstream 90 and downstream 92 bearing walls on the considered convergent flap 30.

Figure 5:
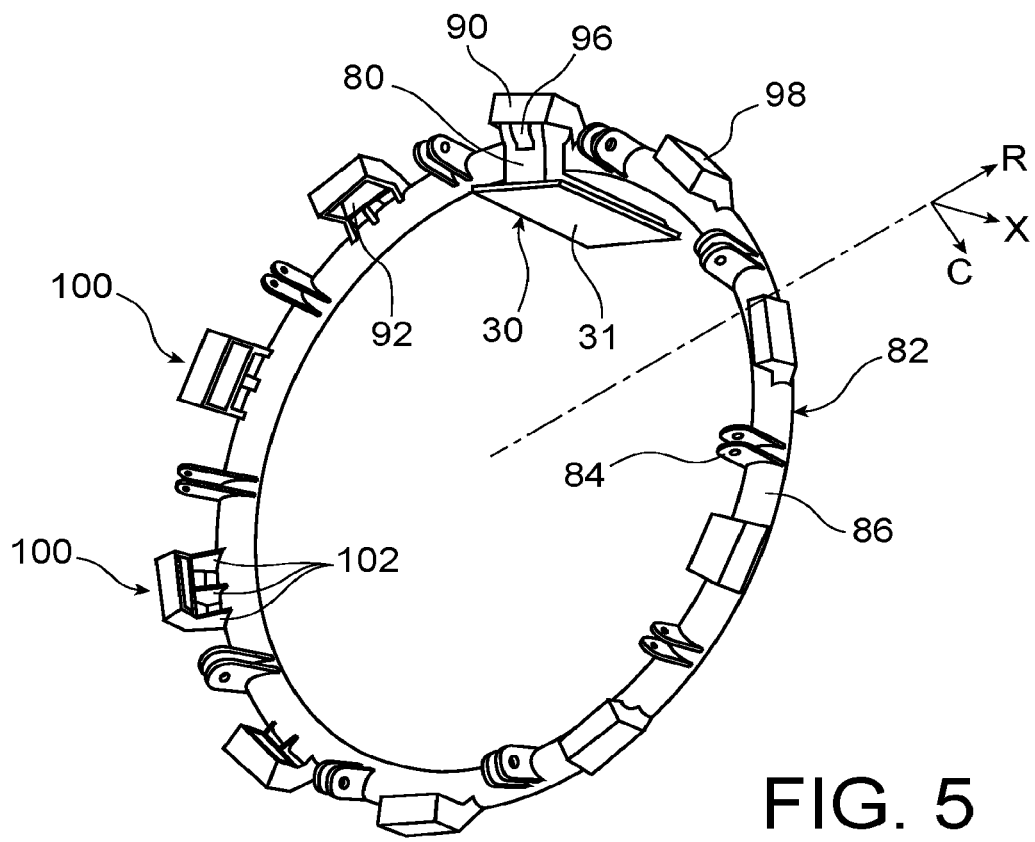
FIG. 5 is a schematic perspective view of some elements composing the rear portion of the turbojet engine of FIG. 1, intended for controlling the convergent flaps.

Thus, for example, the bearing roller 96 is mounted on a shaft carried by two lateral arms 80A, 80B forming an end fork of the lever 80 (FIG. 5).

Moreover, one of the bearing walls, in this case the downstream bearing wall 92, is connected to the movable portion of the drive means via the other one of the bearing walls, in this case the upstream bearing wall 90.

To this end, an outer connecting wall 98 connects together respective radially outer ends of the upstream 90 and downstream 92 bearing walls.

The previous description, relating the manoeuver of the lever of one of the controlled convergent flaps, is preferably also valid for the other controlled convergent flaps.

Thus, in the illustrated embodiment, the upstream bearing wall 90 arranged opposite each lever 80 is spaced circumferentially apart from upstream bearing walls 90 arranged opposite the two levers 80 the closest to the considered lever, and the downstream bearing wall 92 arranged opposite each lever 80 is circumferentially spaced apart from the downstream bearing walls 92 arranged opposite the two levers 80 the closest to the considered lever (FIG. 5). Thus, the upstream 90 and downstream 92 bearing walls form an annular row of bearing devices 100 spaced apart from each other, each bearing device 100 comprising a corresponding pair of bearing walls comprising one of the upstream bearing walls 90 and one of the downstream bearing walls 92.

The turbojet engine rear portion further comprises a synchronisation ring 82 arranged around the set of convergent flaps 30 or, alternatively, arranged a little more upstream around the upstream stator structure 38, and through which each of the bearing devices 100 is connected to the movable portion of the drive means, i.e. to all of the rods 56B of the cylinders 56.

In particular, the movable portion of the drive means is connected to the synchronisation ring 82 so as to be able to move the latter in translation according to the longitudinal axis 11. To this end, the rods 56B of the cylinders 56 are hinged to first clevises 84 of the synchronisation ring 82. Such first clevises 84 are formed projecting from a main body 86, for example having a toroidal shape, of the synchronisation ring 82. For example, the first clevises 84 extend upstream from the main body 86.

It should be noted that the main body 86 of the synchronisation ring may have a more complex shape, including for example an alternation of portions projecting radially inwards and portions projecting radially outwards and/or an alternation of portions projecting upstream and portions projecting downstream. In any case, the main body 86 of the synchronisation ring extends all around the longitudinal axis 11 of the turbojet engine and thus has a generally annular shape.

Each of the bearing devices 100 is connected to the synchronisation ring 82, for example by means of three arms 102 spaced circumferentially apart from each other and each connecting the synchronisation ring 82 to the downstream bearing wall 92.

The bearing devices form an example of actuating means by which the synchronisation ring 82 acts on the controlled convergent flaps 30, to control a geometric variation of the nozzle.

Figure 6:
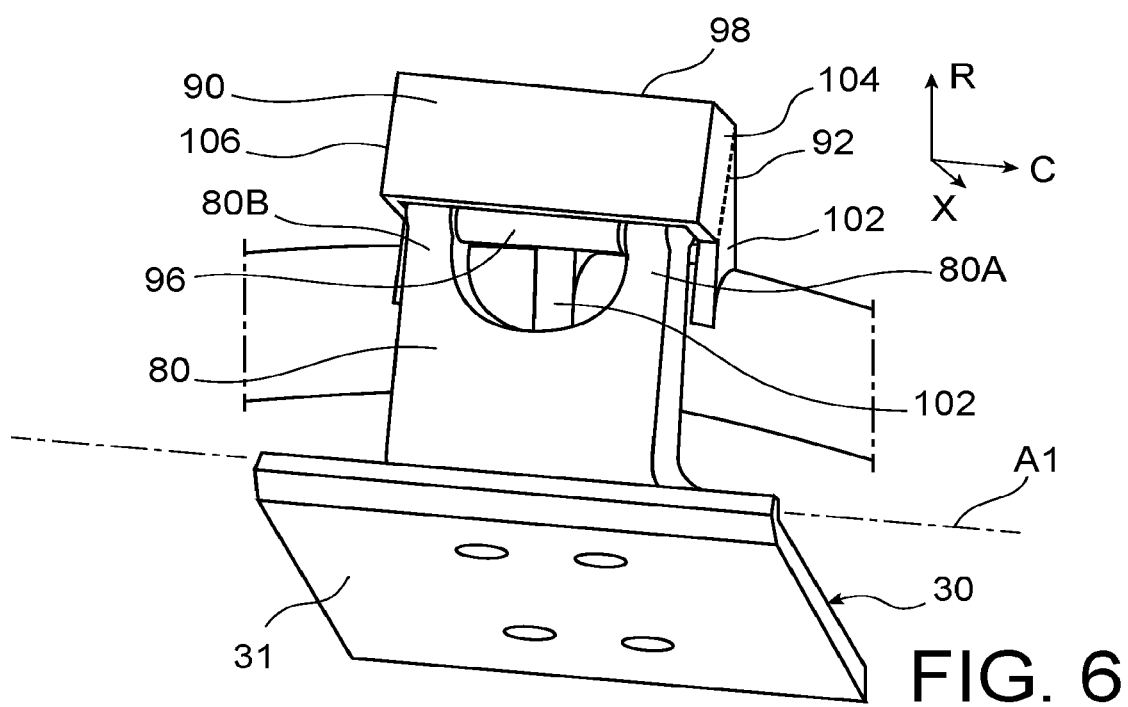
FIGS. 6 and 7 are enlarged schematic perspective views of some of the elements visible in FIG. 5.
Figure 7:
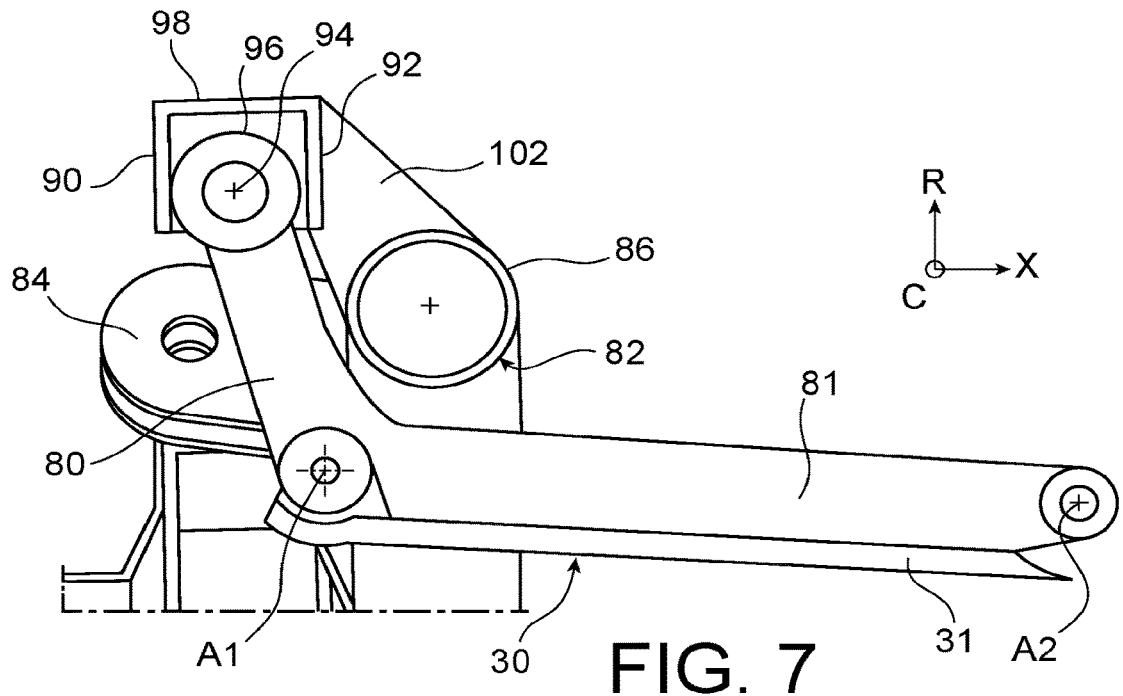

In the illustrated example, within each bearing device 100, one of which is visible in FIG. 6, a first connecting lateral wall 104 connects together respective first circumferential ends of the upstream 90 and downstream 92 bearing walls, and a second connecting lateral wall 106 connects together respective second circumferential ends of the upstream 90 and downstream 92 bearing walls, opposite to the first circumferential ends. Thus, the first and second connecting lateral walls 104, 106 allow connecting the upstream bearing wall 90 to the downstream bearing wall 92 and therefore to the synchronisation ring 82, and via the latter, to the movable portion of the drive means.

In operation, a deployment of the rod 56B of each actuator 56, or more generally a deployment downstream of the movable portion of the drive means, causes a movement downstream of the synchronisation ring 82, which drives each upstream 90 and downstream 92 bearing wall downstream. Thus, each upstream bearing wall 90 is brought into contact with the bearing roller 96 of the corresponding lever 80. Each upstream bearing wall 90 then pushes the bearing roller 96, and therefore the lever 80, downstream, and causes the pivoting of the corresponding flap in the direction of the longitudinal axis 11, which increases the convergence of the convergent flaps 30. The bearing roller 96 rolls on the upstream bearing wall 90 during pivoting of the flap, such rolling being allowed by the clearance between the roller 96 and the other bearing wall, in this case the downstream bearing wall 92.

Conversely, a retraction of the rod 56B of each actuator 56, or more generally a retraction of the movable portion of the drive means upstream, causes an upstream movement of the synchronisation ring 82, which drives each upstream 90 and downstream 92 bearing wall upstream. If the turbojet engine is at stop, each downstream bearing wall 92 is thus brought into contact with the bearing roller 96 of the corresponding lever 80. Each downstream bearing wall 92 then pushes the bearing roller 96, and therefore the lever 80, upstream, and causes pivoting of the corresponding flap in the direction opposite to the longitudinal axis 11, which reduces the convergence of the convergent flaps 30. The bearing roller 96 rolls on the downstream bearing wall 92 during pivoting of the flap, such rolling being, herein again, allowed by the clearance between the roller 96 and the other bearing wall, in this case the upstream bearing wall 90. On the other hand, if the turbojet engine is in operation, it is possible that the thrust of the gases on the convergent flap 30 is enough to cause pivoting of the latter even before the downstream bearing wall 92 comes into contact with the lever 80.

Thus, the cylinders 56 work in the direction of deployment of their rod 56B during a manoeuvre for increasing the convergence of the convergent flaps, which is advantageous from a mechanical perspective. Indeed, at least in the preferred case in which the cylinders 56 are hydraulic cylinders, the deployment of the rod of such a cylinder results from a hydraulic pressure exerted on the entire surface of the piston of the cylinder, whereas the retraction of the rod results from a hydraulic pressure exerted on the surface of the piston reduced by the section of the rod. At least for this reason, the deployment of the rod generally offers increased power compared to the retraction of the rod.

In addition, all of the elements participating to the control of the inner flaps, consisting of the levers 80, the upstream 90 and downstream 92 bearing walls, and the means connecting these to the movable portion of the drive means, may thus have a limited size and mass.

Moreover, the lever 80 of each of the controlled convergent flaps 30 is advantageously arranged at an upstream end of the flap, so as to limit, herein again, the size and the mass of the control system of the flaps as best as possible.

In such a case, it is advantageous for the synchronisation ring 82 to be arranged downstream of the lever 80 of each of the controlled convergent flaps 30.

It should be noted that the bodies 56A of the cylinders 56 may be rigidly fastened on the stator structure 38, in the same manner as in the known example illustrated in FIG. 2 and described hereinabove.

In alternative embodiments, the upstream bearing walls 90 may be connected to each other so as to form a unitary upstream bearing structure extending over 360 degrees. Similarly, the downstream bearing walls 92 may be connected to each other so as to form a unitary downstream bearing structure extending over 360 degrees.

Such bearing structures may be directly integrated into the body 86 of the synchronisation ring 82.

The means implemented to control the positions of the divergent flaps 32 on the basis of the positions of the convergent flaps 30 will be described hereinafter.

For each divergent flap 32, these means comprise a first connecting rod 120 having a first end portion 120A hinged to the corresponding convergent flap and an opposite second end portion 120B, a second connecting rod 122 having a first end portion 122A hinged to the corresponding divergent flap 32 and an opposite second end portion 122B, and a third connecting rod 124 having a first end portion 124A hinged to the synchronisation ring 82 and an opposite second end portion 124B. In addition, the second end portion 120B of the first connecting rod 120 is hinged to at least one amongst the second end portion 122B of the second connecting rod 122 and the second end portion 124B of the third connecting rod 124. Finally, the second end portion 124B of the third connecting rod 124 is hinged to the second end portion 122B of the second connecting rod 122.

In the example illustrated in FIGS. 3 to 7, the second end portion 120B of the first connecting rod 120 is hinged together to the second end portion 122B of the second connecting rod 122 and to the second end portion 124B of the third connecting rod 124, according to a common hinge axis AC.

In addition, the first end portion 120A of the first connecting rod 120 is hinged to the stiffening structure 81 secured to the panel 31 of the convergent flap, according to a third hinge axis A3 which is advantageously closer to the first hinge axis A1 than to the second hinge axis A2. In the illustrated example, the third hinge axis A3 is also closer to a median line LM, located halfway between the first axis A1 and the second axis A2, than to the first axis A1. The first end portion 122A of the second connecting rod 122 is hinged to a clevis 126 secured to the panel 33 of the divergent flap, according to a fourth hinge axis A4 which is advantageously located substantially halfway between the second hinge axis A2 and the downstream end 79B of the divergent flap. Finally, the first end portion 124A of the third connecting rod 124 is hinged to a second clevis 128 of the synchronisation ring 82. Such second clevises 128 are formed projecting from the main body 86 of the synchronisation ring 82 and extend for example downstream and radially outwards from the main body 86.

Figure 8:
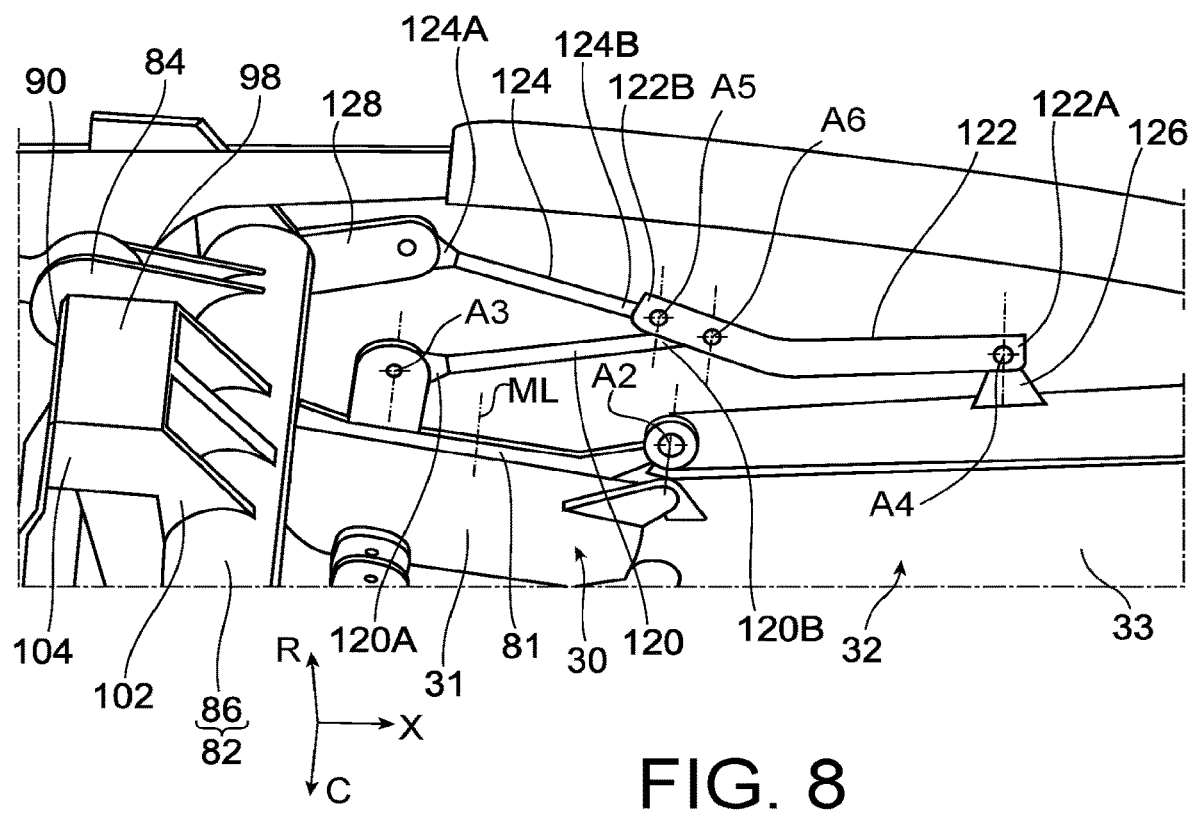
FIG. 8 is a partial schematic perspective view of a turbojet engine rear portion according to one variant, illustrating elements intended for servo-controlling the divergent flaps of the nozzle.

In the variant illustrated in FIG. 8, the second end portion 124B of the third connecting rod 124 is hinged to the second end portion 122B of the second connecting rod 122 according to a fifth hinge axis A5, and the second end portion 120B of the first connecting rod 120 is hinged to the second end portion 122B of the second connecting rod 122 according to a sixth hinge axis A6 located between the fifth hinge axis A5 and the first end portion 122A of the second connecting rod 122.

In operation, the first, second and third connecting rods 120, 122, 124 determine the orientation of the divergent flaps 32 according to an unambiguous law as a function of the orientation of the convergent flaps 30.

This mode for servo-controlling the positions of the divergent flaps allows extending the value range of the A9/A8 ratio. Thus, the extent of this range may typically be increased to 0.35, and even more.

The invention claimed is:
1. A turbojet engine rear portion, comprising:
an upstream stator structure;
a convergent-divergent nozzle with a variable geometry comprising
  a set of convergent flaps distributed around a longitudinal axis of the rear portion of the turbojet engine, each of the convergent flaps comprising a panel intended to channel an exhaust gas flow within the nozzle, and a lever secured to the panel, each of the convergent flaps having an upstream end hinged on the upstream stator structure so that the convergent flaps are movable in rotation around first hinge axes attached to the upstream stator structure, and
  a set of divergent flaps distributed around the longitudinal axis, each of the divergent flaps comprising a panel intended to channel the exhaust gas flow within the nozzle, and each of the divergent flaps having an upstream end hinged on a downstream end of a corresponding convergent flap so that the divergent flaps are movable in rotation around second hinge axes attached to the convergent flaps;
a synchronisation ring arranged around the set of convergent flaps or the upstream stator structure and configured to act on at least some of the convergent flaps, called controlled convergent flaps, to control a geometric variation of the nozzle;
cylinders configured to move the synchronisation ring in translation according to the longitudinal axis, relative to the upstream stator structure, each cylinder including a body fastened to the upstream stator structure and a rod that is movable and connected to the synchronisation ring; and
connecting rods configured to control positions of the divergent flaps based on positions of the convergent flaps, the connecting rods comprising a first connecting rod having a first end portion hinged to the corresponding convergent flap according to a third hinge axis distinct from the first and second hinge axes and an opposite second end portion, a second connecting rod having a first end portion hinged to the corresponding divergent flap according to a fourth hinge axis and an opposite second end portion, and a third connecting rod having a first end portion hinged to the synchronisation ring and an opposite second end portion,
wherein the second end portion of the first connecting rod is hinged to at least one of the second end portion of the second connecting rod and the second end portion of the third connecting rod,
wherein the second end portion of the third connecting rod is hinged to the second end portion of the second connecting rod, and
wherein the second end portion of the first connecting rod is hinged together to the second end portion of the second connecting rod and to the second end portion of the third connecting rod, according to a common hinge axis.

2. The turbojet engine rear portion according to claim 1, wherein an A9/A8 ratio, equal to the quotient of a section A9 of the nozzle at a downstream end of the divergent flaps by a section A8 of the nozzle at a neck formed at a junction between the convergent flaps and the divergent flaps, varies by 0.35.

3. A turbojet engine for an aircraft, comprising a rear portion according to claim 1.

* * * * *